(12) United States Patent
Seki et al.

(10) Patent No.: US 9,205,507 B2
(45) Date of Patent: Dec. 8, 2015

(54) NUCLEAR POWER PLANT CONSTRUCTION PREPARATION UNIT, NUCLEAR POWER PLANT CONSTRUCTION SYSTEM, AND NUCLEAR POWER PLANT CONSTRUCTION METHOD

(75) Inventors: Isao Seki, Tokyo (JP); Hisanobu Watanabe, Tokyo (JP); Yuichi I, Tokyo (JP); Takayuki Matsuura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 332 days.

(21) Appl. No.: 13/349,043

(22) Filed: Jan. 12, 2012

(65) Prior Publication Data

US 2012/0180318 A1  Jul. 19, 2012

(30) Foreign Application Priority Data

Jan. 13, 2011 (JP) .................................. 2011-004740

(51) Int. Cl.
*G06F 19/00* (2011.01)
*B23K 9/00* (2006.01)
(Continued)

(52) U.S. Cl.
CPC ............. *B23K 9/0052* (2013.01); *B23K 31/125* (2013.01); *B23K 9/08* (2013.01); *B23K 31/12* (2013.01); *B23K 2201/06* (2013.01)

(58) Field of Classification Search
CPC .......... B23K 31/00; B23K 31/12; B23K 9/00; B23K 9/08; B23K 31/125; B23K 9/0052; B23K 2201/06

USPC .................. 700/245–264; 701/25, 62, 65, 66; 901/1, 46; 356/247, 601, 614; 358/1.9, 358/739; 30/123

See application file for complete search history.

(56) References Cited

U.S. PATENT DOCUMENTS

| 4,648,454 A * | 3/1987 | Yarnell .......................... 166/297 |
| 6,195,454 B1 * | 2/2001 | Yazawa .......................... 382/151 |
| 2008/0154538 A1 * | 6/2008 | Stathis .......................... 702/152 |

(Continued)

FOREIGN PATENT DOCUMENTS

| JP | 61-031803 A | 2/1986 |
| JP | 2000-153356 A | 6/2000 |

(Continued)

OTHER PUBLICATIONS

JP2000153356A English_machine_translation.*

(Continued)

*Primary Examiner* — Jason Holloway
*Assistant Examiner* — Rachid Bendidi
(74) *Attorney, Agent, or Firm* — Westerman, Hattori, Daniels & Adrian, LLP

(57) ABSTRACT

A nuclear power plant construction preparation unit includes: a device main body which enters into a space; a moving part which causes the device main body to enter into the space; an eddy-current inspection sensor which is provided on the device main body, and which detects a target portion of a member surface within the space; a punch marking part which is provided on the device main body, and which performs marking on the member surface; and a control part which controls the moving part and the marking device based on detection results from the target portion detection device, to thereby perform marking at a relative position with respect to the target portion.

3 Claims, 5 Drawing Sheets

(51) Int. Cl.
 B23K 31/12 (2006.01)
 B23K 9/08 (2006.01)

(56) References Cited

U.S. PATENT DOCUMENTS

| | | | |
|---|---|---|---|
| 2010/0057254 A1* | 3/2010 | Salamanca | 700/245 |
| 2010/0325859 A1* | 12/2010 | Poling et al. | 29/402.07 |
| 2012/0209429 A1* | 8/2012 | Yamaguchi et al. | 700/259 |
| 2012/0239191 A1* | 9/2012 | Versteeg et al. | 700/246 |
| 2013/0231777 A1* | 9/2013 | Salamanca | 700/245 |

FOREIGN PATENT DOCUMENTS

| | | |
|---|---|---|
| JP | 2000-249783 A | 9/2000 |
| JP | 2010-145372 A | 7/2010 |

OTHER PUBLICATIONS

Woo et al., A robot system for road lane painting, 2008, Automation in Construction, pp. 122-129.*

Japanese Office Action dated Sep. 2, 2014, issued in corresponding JP application No. 2011-004740 with English translation (10 pages).

* cited by examiner

NUCLEAR POWER PLANT CONSTRUCTION PREPARATION UNIT, NUCLEAR POWER PLANT CONSTRUCTION SYSTEM, AND NUCLEAR POWER PLANT CONSTRUCTION METHOD

BACKGROUND OF THE INVENTION

1. Field of the Invention

The present invention relates to a nuclear power plant construction preparation unit, a nuclear plant construction system, and a nuclear power plant construction method.

Priority is claimed on Japanese Patent Application No. 2011-004740, filed Jan. 13, 2011, the contents of which are incorporated herein by reference.

2. Description of Related Art

As a maintenance operation performed inside the nozzle at the inlet part and outlet part of a nuclear reactor vessel, there has been conventionally known a type of construction work (hereunder, referred to as INLAY work), in which the surface of the welded portion between a nozzle on the vessel side and piping is shaved off, and overlay welding is re-performed thereon with a material with a high level of corrosion resistance.

In this type of INLAY work, on the portion which undergoes the INLAY work, that is, on the portion to be welded, operations such as preliminary examination, groove processing, welding, weld flattening, and final inspection are carried out in this order.

Since the interior of the nozzle, which undergoes these operations, is exposed to an environment into which it is difficult for humans to enter, for devices (such as the preliminary examination device, shaving device, welding device, weld flattening device, and inspection device) corresponding to the respective operations above, there is provided a unique positioning reference for each device based on the dimensions of the nuclear reactor vessel in the drawings.

Incidentally, for example, Patent Document 1 discloses an operation performed inside the nozzle.

Patent Document 1 discloses an inner surface monitoring device and an automatic welding device such that: a monitoring sensor is arranged on the groove back surface side of the piping; and when the groove is welded by a welding device at the time of performing root pass welding, the fusion state associated with this welding is image-captured by the monitoring sensor, and the information associated with this image capturing is displayed on the monitor display.

PRIOR ART DOCUMENT

Patent Document

[Patent Document 1] Japanese Unexamined Patent Application, First Publication No. 2000-153356.

Problems to be Solved by the Invention

However, the following problem is present in the conventional INLAY work performed inside the nozzle.

That is to say, there is a problem in that in order to interchange devices corresponding to respective operations according to the operation to be performed, positioning is performed for each device in accordance with the positioning reference unique to each device, and therefore, a large amount of time is required.

Furthermore, there is a problem in that positioning error (variation) occurs for each device, and the level of set precision of the construction area is reduced, and the construction area may even become off-specification in some cases, in respective operations including preliminary investigation, groove processing, welding, flat finishing of welded portion, and final inspection. In this regard, there is room for improvement.

SUMMARY OF THE INVENTION

The present invention takes into consideration the above problems, with an object of providing a nuclear power plant construction preparation unit, a nuclear power plant construction system, and a nuclear power plant construction method, capable of performing construction in a short period of time with a high level of device positioning precision.

Means for Solving the Problem

The nuclear power plant construction preparation unit according to the present invention comprises: a device main body which enters into a space; a moving part which causes the device main body to enter into the space; a target portion detection device which is provided on the device main body, and which detects a target portion of a member surface within the space; a marking device which is provided on the device main body, and which performs marking on the member surface; and a control part which, based on detection results from the target portion detection device, controls the moving part and the marking device, to thereby perform marking at a relative position with respect to the target portion.

The nuclear power plant construction system according to the present invention comprises: the nuclear power plant construction preparation unit described above; and a construction unit which performs construction at the target portion with reference to the position marked by the construction preparation unit.

The nuclear power plant construction method according to the present invention comprises the steps of: causing a device main body to enter into a space; detecting a target portion of the member surface within the space; and performing marking at the relative position on the member surface with respect to the detected target portion.

According to the present invention, when performing construction using the construction unit inside the space at a nuclear power plant, which is an environment into which it is difficult for humans to enter, the moving part first causes the construction preparation unit to enter into the space, and the target portion detection device detects a target portion of a member surface within the space.

Then, the marking device performs marking on the member surface at the position where the target portion is detected with the construction preparation unit. At this time, since the target portion detection device and the marking device are provided on the device main body, and the positions thereof relative to each other both take a fixed value, the marking applied to the member surface serves as a reference position based on the position of the detected target portion. Accordingly, by providing the construction unit with a function capable of making position adjustment with the marking taken as a reference (such as a laser light emitting unit and a camera), it is possible to perform positioning of the construction unit at a high level of precision with the marking taken as a reference. That is to say, since the positions of the marking and the target portion both take a fixed value, by identifying the location of the construction unit in concert with the marking position, it is possible to perform construction at a high level of precision with respect to the target portion at the construction unit.

Moreover, since each construction unit is positioned with respect to the same reference (marking), it is possible to prevent positioning errors of each construction unit, which occur as a result of variations of detection values, as with the conventional cases where positioning is performed by detecting a target portion for each construction unit. Therefore, in a case of carrying out construction work where operations are sequentially performed at a predetermined target portion with different construction units, there is an advantage in that the construction can be performed at a high level of precision.

In addition, since there is no need for performing target portion detection, which consumes time for each construction unit, an area of construction can be set quickly and the amount of time required for the operation can be reduced.

Effects of the Invention

According to the nuclear power plant construction preparation unit, the nuclear power plant construction system, and the nuclear power plant construction method of the present invention, marking is preliminarily performed at a position relative to the target portion, and this marking is taken as a reference for positioning a construction unit which subsequently performs an operation. Thereby, each construction unit can be positioned at a high level of precision. Therefore, there can be achieved an effect such that an area of construction can be set quickly, and the amount of time required for positioning each construction unit can be reduced.

DETAILED DESCRIPTION OF THE INVENTION

Hereunder, a nuclear power plant construction preparation unit, a nuclear power plant construction system, and a nuclear power plant construction method according to an embodiment of the present invention are described, based on the drawings.

Figure 1:
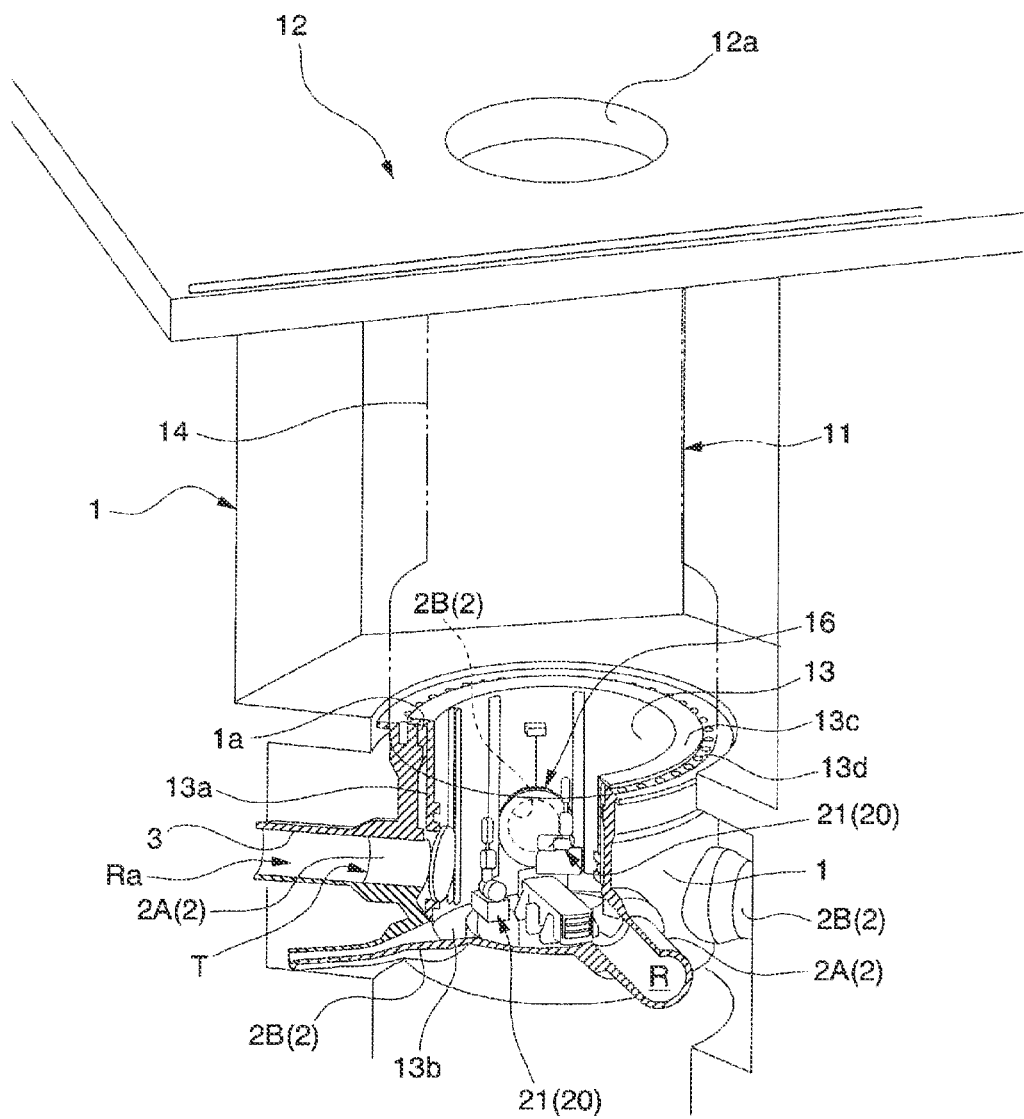
FIG. 1 is a partially cutaway overall perspective view showing an overview of a construction system according to an embodiment of the present invention.

FIG. 1 shows a nuclear reactor vessel 1, to which a construction preparation unit 20 configured to perform an tube stand operation, and the nuclear power plant construction system are applied, and it illustrates the nuclear reactor vessel 1 being in a state where, inside the nuclear reactor, a top cover, which is an upper structure, and a reactor core structure, which is an inner structure, are both removed, and the upper part is opened. In the present embodiment, the application object is an operation (INLAY work) of shaving off the inner surface of a welded portion between a tube stand 2 on the nuclear reactor vessel 1 side and piping 3, and re-performing overlay welding with a highly corrosion-resistant material.

As shown in FIG. 1, at least a pair of an inlet tube stabnd 2A and an outlet tube stand 2B are provided as the tube stand 2 in the nuclear reactor vessel 1, and are respectively connected to the piping 3 by means of welding. In the present embodiment, there are provided three pairs, and cooling water can be supplied from the inlet tube stand 2A of each pair into the interior, while cooling water can be discharged from the outlet tube stand 2B.

In the present construction system, there are provided a bottom-ended cylindrical pedestal 11, the lower end side of which is inserted into the nuclear reactor vessel 1 through an upper opening 1a, and which extends upward, and a work platform 12 provided above the nuclear reactor vessel 1.

The pedestal 11 has a platform 13 arranged inside the nuclear reactor vessel 1, and a substantially cylindrical connection pipeline 14 which is connected to the platform 13 and is arranged along the vertical direction above the nuclear reactor vessel 1. The platform 13 has a substantially cylindrical side wall 13a with an outer diameter smaller than the inner diameter of the nuclear reactor vessel 1, a bottom plate 13b which blocks the lower end of the side wall 13a, and a flange 13c which hangs over outward from the upper end of the side wall 13a, and which is supported on the upper periphery of the nuclear reactor vessel 1. The platform 13 is fixed to the nuclear reactor vessel 1, using fixation holes 13d formed on the flange 13c.

Moreover, the lower end of the connection pipeline 14 is fixed on the flange 13c of the platform 13, and a side wall portion 11a of the pedestal 11 is configured with the side wall 13a of the platform 13 and the connection pipeline 14. Furthermore, a bottom part 11b of the pedestal 11 is configured with the bottom plate 13b of the platform 13. Moreover, the connection pipeline 14, at the upper end thereof, communicates with a communication hole 12a formed at a position on the work platform 12 above the nuclear reactor vessel 1. Accordingly, on the work platform 12, access to the interior of the pedestal 11 is possible through the communication hole 12a.

The area between the flange 13c of the platform 13 and the upper end of the nuclear reactor vessel 1, and the area between the flange 13c of the platform 13 and the lower end of the connection pipeline 14 are respectively sealed. As a result, even if water inside the nuclear reactor vessel 1 is discharged and the water level falls below the nozzle 2, the cooling water filling the surrounding of the connection pipeline 14 above the nuclear reactor vessel 1 will not leak into the interior of the nuclear reactor vessel 1 or the interior of the pedestal 11.

Figure 2:
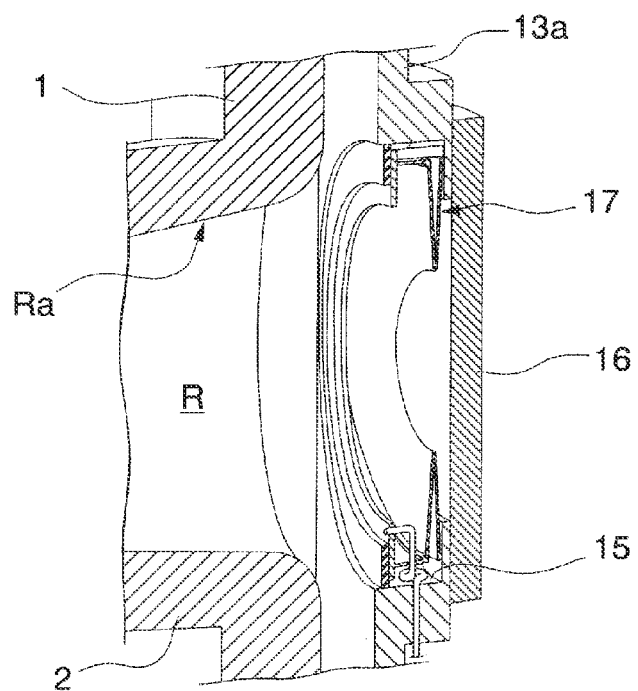
FIG. 2 is a perspective view showing details of a tube stand within a nuclear reactor vessel.

Here, as shown in FIG. 2, in the side wall 13a of the platform 13 on the pedestal 11, there is formed an access window 15 which communicates with each nozzle 2, and there is formed an access window opening/closing door 16 which is capable of opening and closing the access window 15. The access window opening/closing door 16 is operated to open or close by an appropriate driving device such as an electronic winch (not shown in the figure).

Moreover, on the inner circumferential surface of each access window 15, there is formed a gap blocking device 17 which blocks the gap between the access window 15 and the tube stand 2.

The construction preparation unit 20 has a function for providing, before performing various in-tube stand operations, a device reference position to a portion with no reference for performing various operations.

Figure 3:
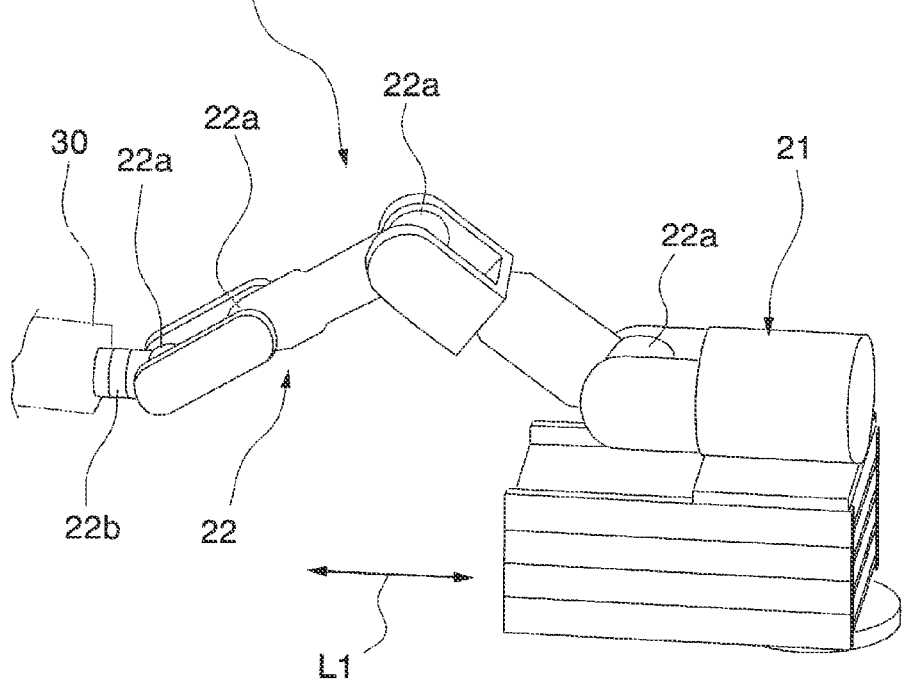
FIG. 3 is a perspective view showing a configuration of a moving device and a manipulator of a construction preparation unit.

As shown in FIG. 3, the construction preparation unit 20 comprises a device main body 30 to be inserted into a space interior R (a space having an environment into which it is difficult for humans to enter) of the tube stand 2, and a moving device 21 (moving part) for inserting the device main body 30 into the space interior R. The moving device 21 is provided so that it can be raised or lowered from the work platform 12 into the interior of the pedestal 11 through the communication hole 12a by a raising-lowering device (not shown in the figure).

The moving device 21 is provided so as to be able to be slide-moved within the tube stand 2 together with the construction preparation unit 20 connected to the moving device 21 via the manipulator 22.

The manipulator 22 is configured in a multi-joint structure with a plurality of joint parts 22a, and thereby, it can freely rotate about three axes, namely an axis parallel with the slide direction L1, and two axes orthogonal to this axis. That is to say, the device main body 30 provided on the tip end 22b of the manipulator 22 can be rotation-moved about arbitrary axes.

Figure 4:
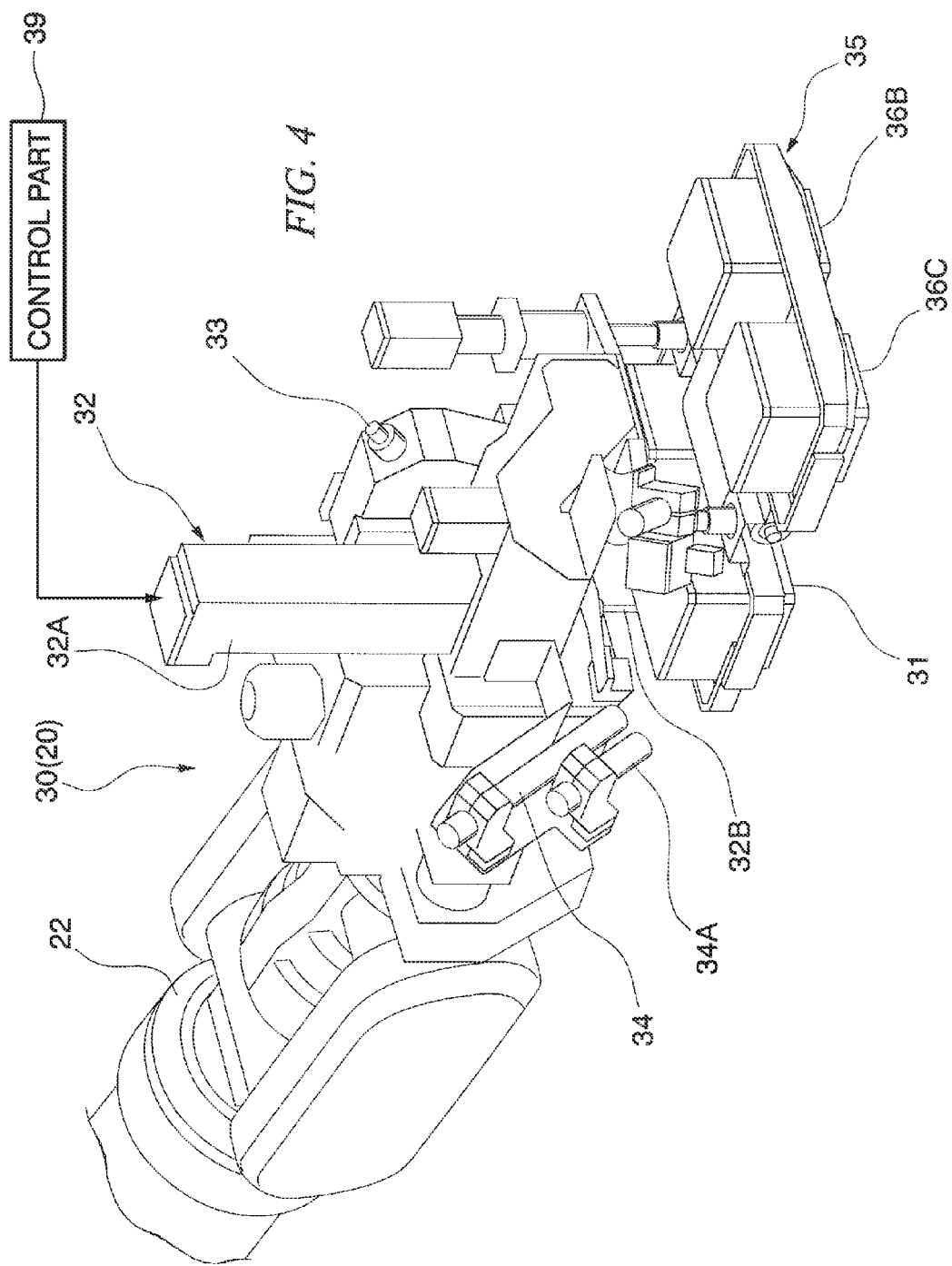
FIG. 4 is a perspective view showing details of a device main body of the construction preparation unit.
Figure 5:
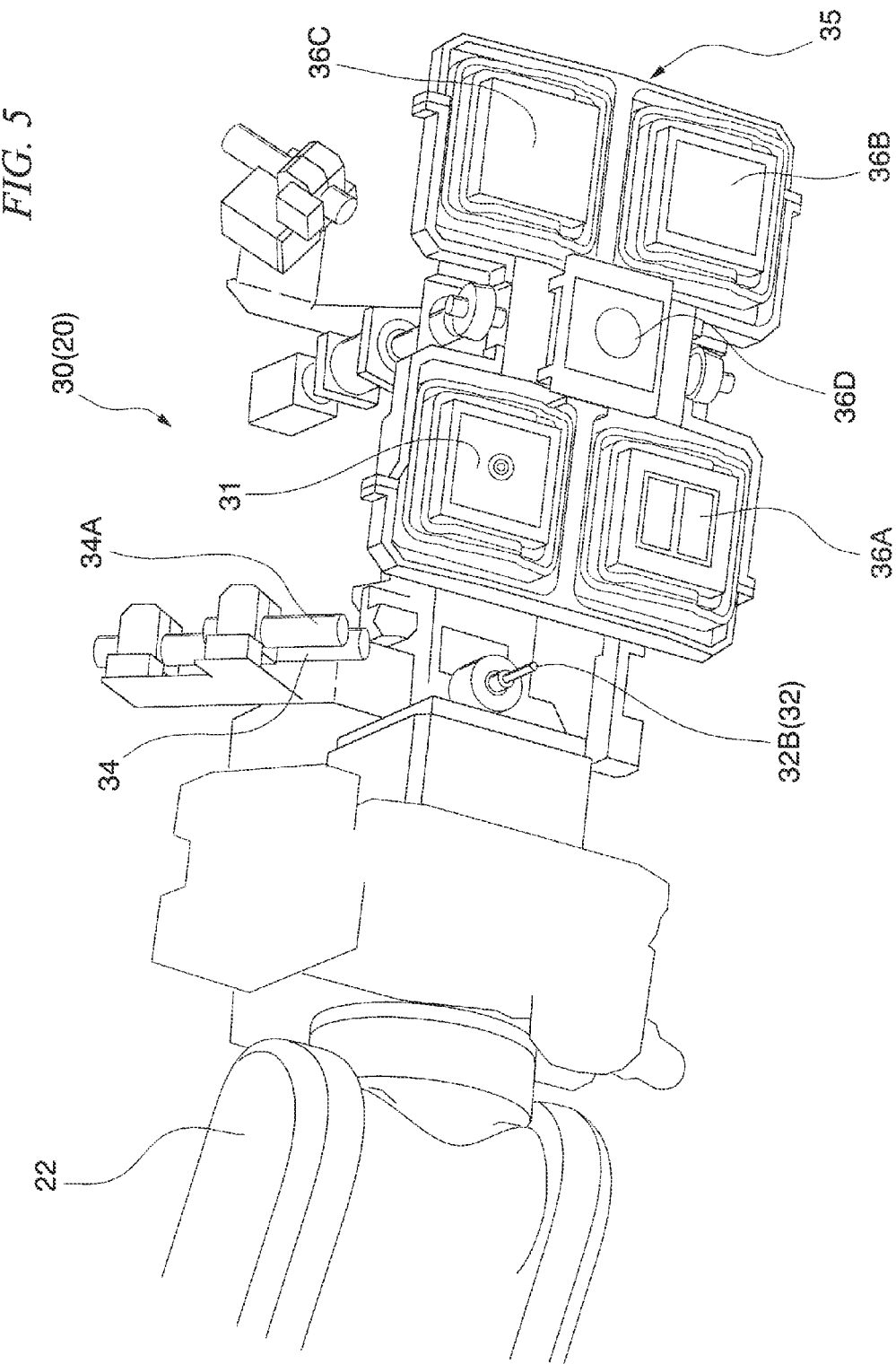
FIG. 5 is a perspective view taken from another angle, showing details of the device main body of the construction preparation unit.
Figure 6:
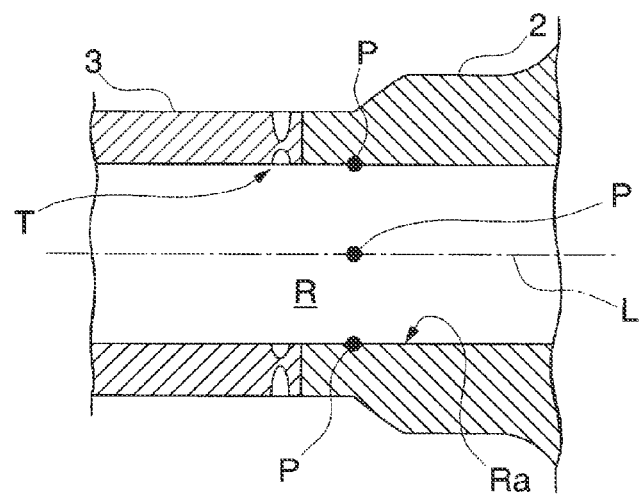
FIG. 6 is a side view schematically showing a marking state of an inner pipe surface.

Moreover, as shown in FIG. 4 and FIG. 5, the construction preparation unit 20 is such that on the device main body 30 there are provided: an eddy-current inspection sensor 31 (target portion detection device) which inspects a target portion (here, a welded portion T which is on a border between the tube stand 2 and the piping 3) of the inner pipe surface Ra (member surface) within the space R in the tube stand 2 and the piping 3 shown in FIG. 6; and a punch marking part 32 (marking device) which forms a punch mark P (marking) on the inner pipe surface Ra. Furthermore there is provided a control part 39 which controls the moving device 21 and the punch marking part 32 based on inspection results from the eddy-current inspection sensor 31, to thereby mark the punch mark P at a position relative to the welded portion T.

Furthermore, in the device main body 30, there are provided: a first laser displacement gauge 33 which irradiates a laser beam onto the punch mark P; a first camera 34 which monitors this laser beam; and an illumination part 34A which illuminates the image capturing range of the first camera 34.

The eddy-current inspection sensor 31 is arranged on a part of a sensor seat part 35 provided in the device main body 30. The sensor seat part 35 has a sensor attachment surface 35a facing the inner pipe surface Ra, and is provided rotatable about the pipe axis L. On the sensor attachment surface 35a, there are attached several types of sensors 36A to 36D. One of the several sensors is the eddy-current inspection sensor 31 described above. As the other sensors 36A to 36D, for example, there are provided a plate thickness measurement sensor (overlay vertical), and an ultrasonic detection sensor for overlay normality confirmation which inspects whether or not there is any defect (cavity) in the portion undergoing the construction operation.

Furthermore, specifically, the eddy-current inspection sensor 31 detects a welded portion T. It has a coil embedded therein, and detects fluctuations in eddy currents applied to the inner pipe surface Ra, associated with material variability of the inner pipe surface Ra, and detects the circumferential angle of the pipe, with rotation of the sensor seat part 35. The inspection data detected by the eddy-current inspection sensor 31 is combined with the axial value of the manipulator 22 which multi-axially moves the device main body 30, so that a range of the welded portion T (position in the axial direction and circumferential direction) with respect to the axial position of the device main body 30 is identified.

The punch marking part 32 is arranged at a fixed position where the distance from the eddy-current inspection sensor 31 becomes a constant value. In the present embodiment, the punch marking part 32 is arranged at a position on the manipulator 22 side than the eddy current detection sensor 31. Specifically, the punch marking part 32 is of a configuration such that it has a punch shaft 32A provided in the direction orthogonal to the pipe axis L direction, has a rod-shaped punch 32B provided on the tip end of the punch shaft 32A, and rotates about the pipe axis L together with the sensor seat part 35. On the punch shaft 32A, there is fitted a biasing member or the like for thrusting out the punch 32B with a predetermined ejection force.

As the punch 32B, there is applied a low-stress punch capable of marking a punch mark P on the inner pipe surface Ra to a degree which does not influence plant operation and device functions. By employing a punch mark P as a marking method, visibility and durability (fade resistance) of marking can be provided.

Moreover, the position of the eddy-current inspection sensor 31 and the position of the punch 32B are preliminarily registered in the control part 39. That is to say, the punch marking part 32 is capable of marking a punch mark P on the inner pipe surface Ra while maintaining its position relative to the eddy-current inspection sensor 31. Then, this punch mark P serves as a reference for positioning each construction unit to an operation position.

Figure 7:
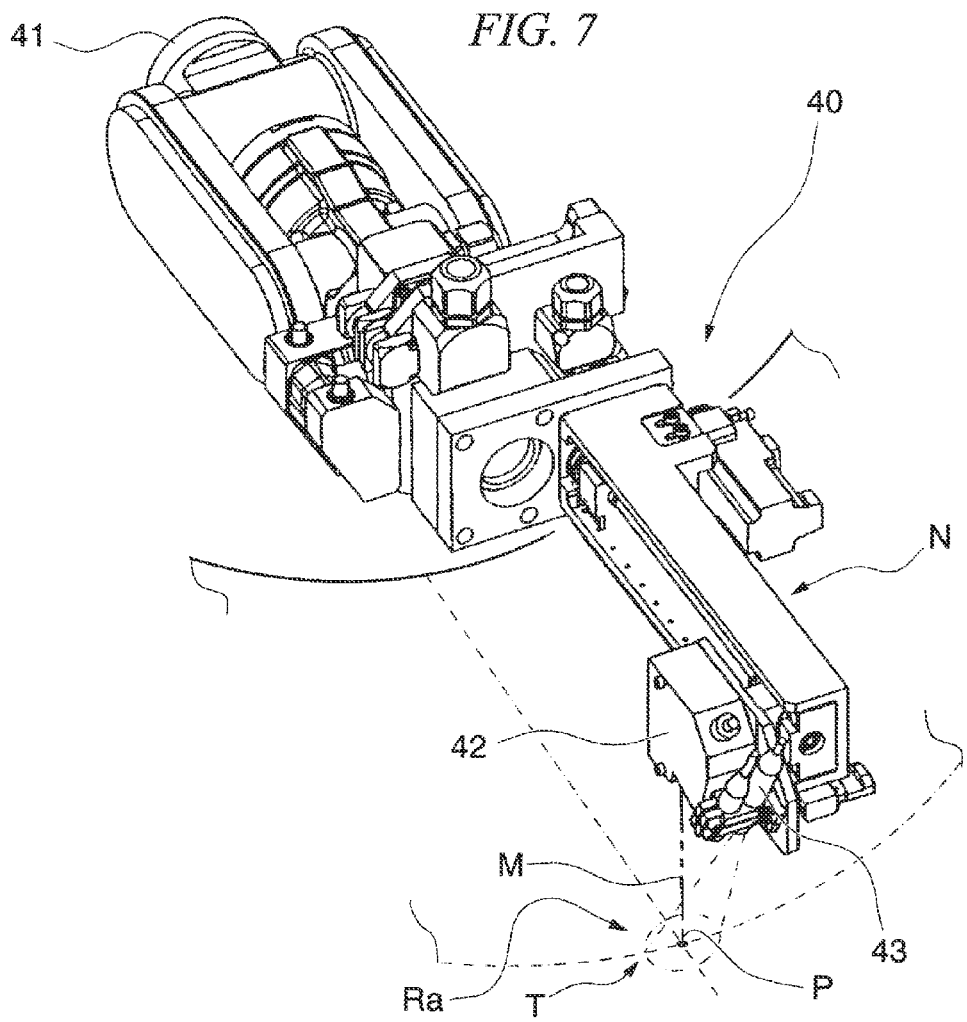
FIG. 7 is a perspective view showing details of a construction unit.

Next, a positioning mechanism N commonly provided on each construction unit 40 for performing welding operations is described, based on the drawing. As shown in FIG. 7, each construction unit 40 is attached to a multi-axial manipulator 41 provided on a moving device (not shown in the figure), as with the manipulator 22 described above. This construction unit 40 is provided as a unit for each operation required for welding such as shaving, welding, finishing, and inspection. More specifically, as the construction unit 40 there are used; a welding unit which performs welding on the inner pipe surface Ra, a shaving unit which shaves the inner pipe surface Ra, a finish-processing unit which performs finish-processing on the inner pipe surface Ra, and an inspection unit which inspects the inner pipe surface Ra after undergoing the finishing process.

Detailed descriptions of these respective operation devices are omitted. The positioning mechanism N commonly provided on each construction unit 40 is described here.

The positioning mechanism N comprises a second laser displacement gauge 42, and a second camera 43 arranged so as to be able to capture a laser beam emitted from the second laser displacement gauge 42. The positioning mechanism N has a function for correcting the reference position of the construction unit 40 (a predetermined position which undergoes an operation) by aligning the optical axis M of the laser beam with the punch mark P which is a reference for the construction preparation unit 20 described above, based on an image obtained by the second camera 43. As the positioning operation to be performed with the positioning mechanism N, there may be employed a method where primary positioning with an approximate position for an object of positioning is performed with automatic control, and then secondary positioning with fine adjustment for the object is manually performed. Alternatively, the primary positioning and the second positioning may both be performed automatically.

Next, operation of the construction preparation unit configured as described above, and a positioning method of the construction unit 40 based on the construction system are described, based on the drawings.

As shown in FIG. 1, in a case where construction work with use of the construction unit 40 is to be performed in the space interior R in the tube stand 2 and piping 3, which is an environment into which it is difficult for humans to enter, first, the construction preparation unit 20 together with the moving device 21 are made to pass through the interior of the pedestal 11 and are inserted into the platform 13 from the work platform 12. Further, they enter into the space interior R and detect a welded portion T (target portion) of the inner pipe surface Ra with the eddy current detection sensor 31.

As shown in FIG. 5 and FIG. 6, at the position where the welded portion T is detected in the construction preparation unit 20, a punch mark P is marked on the inner pipe surface Ra with the punch marking part 32. At this time, since the eddy-current inspection sensor 31 and the punch marking part 32 are provided on the device main body 30, and the positions thereof relative to each other take a fixed value, the punch mark P formed on the inner pipe surface Ra serves as a reference position based on the position of the welded portion T.

Accordingly, since the positioning mechanism N capable of making positional adjustment while taking the punch mark P as a reference, is provided in the construction unit 40 shown in FIG. 7, it is possible to perform positioning of the construction unit 40 at a high level of precision, with the punch mark P serving as a reference. That is to say, since the positions of the punch marking P and the welded portion T both take a fixed value, by positioning the construction unit 40 so as to align with the punch marking P position, it is possible with the construction unit 40 to perform construction at a high level of precision with respect to the welded portion T.

Moreover, since each construction unit 40 is positioned with respect to the same reference (punch marking P), it is possible to prevent positioning errors of each construction unit, which occur as a result of variations of detection values, as with the conventional cases where positioning is performed by detecting a target portion for each construction unit.

Therefore, in a case of carrying out construction work where operations are sequentially performed at a predetermined welded portion T with different construction units, there is an advantage in that the construction can be performed at a high level of precision.

In addition, since there is no need for performing target portion detection, which consumes time for each construction unit 40, an area of construction can be set quickly and the amount of time required for the operation can be reduced.

With the nuclear power plant construction preparation unit, the nuclear power plant construction system, and the nuclear power plant construction method according to the present embodiment described above, by preliminarily providing a punch mark P at a position relative to a welded portion T using a the construction preparation unit 20, and taking this punch mark P as a reference for positioning the construction unit 40 to be subsequently operated, each construction unit 40 can be positioned at a high level of precision. Therefore, there can be achieved an effect such that an area of construction can be set quickly, and the amount of time required for positioning each construction unit 40 can be reduced.

The foregoing has described an embodiment of the nuclear power plant construction preparation unit, the nuclear power plant construction system, and the nuclear power plant construction method according to the present invention. However, the present invention is in no way limited to the embodiment described above, and appropriate modifications may be made without departing from the scope of the invention.

For example, as a means for marking, the present embodiment employs a punch mark P provided by means of punch marking. However, it is not limited to this, and marking may be provided by means such as magic scribing marking and scriber marking.

Moreover, as the target portion detection device, the present embodiment employs an eddy-current inspection sensor 31. However, it is not limited to this type of sensor, and, for example, an ultrasonic detection sensor for performing ultrasonic inspection or the like may be used as the target portion detection device.

The configurations such as the attachment structure of the eddy current detection sensor 31 (structure to arrange it on a part of the sensor seat part 35) and distance between the eddy current detection sensor 31 and the punch marking part 32, may also be appropriately set.

Furthermore, the object of construction work is not limited to a joining portion (welded portion T) between the tube stand 2 and piping 3, and any facility and part of a nuclear power plant can be taken as the application object. Moreover, although not limited to INLAY work, the present invention is suitable in the case of installing the above facility into a space under an environment into which it is difficult for humans to enter.

In addition, without departing from the scope of the invention, the components of the above embodiment may be appropriately substituted by commonly known components, and further, the embodiments mentioned above may be appropriately combined.

DESCRIPTION OF THE REFERENCED SYMBOLS

1: nuclear reactor vessel
2: tube stand
3: piping
20: construction preparation unit
21: moving device
22: manipulator
30: device main body
31: eddy-current inspection sensor (target portion detection device)
32: punch marking part (marking device)
32A: punch shaft
32B: punch
33: first laser displacement gauge
34: first camera
35: sensor seat part
40: construction unit
42: second laser displacement gauge
43: second camera
M: optical axis
N: positioning machine
P: punch mark (marking)
R: space interior
Ra: inner pipe surface (member surface)
T: welded portion (target portion)

What is claimed is:
1. A nuclear power plant construction system comprising:
a nuclear power plant construction preparation unit; and
a construction unit which performs construction at a welded portion, using a position marked with the nuclear power plant construction preparation unit as a reference,
wherein the nuclear power plant construction preparation unit includes:
a device main body which enters into a space, the space being surrounded by a tube and a pipe, the tube and the pipe being welded to each other via the welded portion;

a moving part which causes the device main body to enter into the space;

a target portion detection device which is provided on the device main body, and which detects the welded portion of a member surface within the space;

a marking device which is provided on the device main body, and which forms a portion having durability by changing a surface shape on the member surface within the space; and a control part which controls the moving part and the marking device based on detection results from the target portion detection device, to thereby perform marking at a relative position with respect to the welded portion.

2. A method of constructing a nuclear power plant, comprising the step of:

performing construction at a welded portion by using a position marked with a nuclear power plant construction preparation unit as a reference;

using a moving part to cause a device main body of the nuclear power plant construction preparation unit to enter into a space, the space being surrounded by a tube and a pipe, the tube and the pipe being welded to each other via a welded portion;

detecting the welded portion of a member surface within the space by a target portion detection device which is provided on the device main body;

providing a marking device on the device main body, the marking device forming a portion having durability by changing a surface shape on the member surface within the space; and controlling, using a control part, the moving part and the marking device based on detection results from the target portion detection device and performing marking at a relative position with respect to the welded portion.

3. A nuclear power plant construction system comprising:

a nuclear power plant construction preparation unit; and a construction unit which performs construction at a welded portion, using a position marked with the nuclear power plant construction preparation unit as a reference, wherein the nuclear power plant construction preparation unit includes:

a device main body which enters into a space, the space being surrounded by a tube and a pipe, the tube and the pipe being welded to each other via the welded portion;

a moving part which causes the device main body to enter into the space;

a target portion detection device which is provided on the device main body, and which detects the welded portion of a member surface within the space;

a marking device which is provided on the device main body, and which forms a portion having durability by changing a surface shape on the member surface within the space; and a control part which controls the moving part and the marking device based on detection results from the target portion detection device, to thereby perform marking at a relative position with respect to the welded portion, wherein the portion having the durability includes a recess portion.

* * * * *